(12) United States Patent
Kenney et al.

(10) Patent No.: US 8,855,142 B2
(45) Date of Patent: Oct. 7, 2014

(54) CODED BIT PADDING

(75) Inventors: Thomas J. Kenney, Portland, OR (US);
Eldad Perahia, Portland, OR (US);
Robert J. Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/658,014

(22) Filed: Feb. 1, 2010

(65) Prior Publication Data

US 2011/0188518 A1    Aug. 4, 2011

(51) Int. Cl.
*H04L 5/00* (2006.01)
*H04J 11/00* (2006.01)
*H04L 1/00* (2006.01)
*H04J 3/00* (2006.01)

(52) U.S. Cl.
CPC ............ *H04L 5/0044* (2013.01); *H04L 1/0041* (2013.01); *H04L 1/0071* (2013.01); *H04L 1/0084* (2013.01)
USPC .......................................... 370/476; 375/260

(58) Field of Classification Search
None
See application file for complete search history.

(56) References Cited

U.S. PATENT DOCUMENTS

| | | |
|---|---|---|
| 6,480,475 B1 | 11/2002 | Modlin et al. |
| 2006/0087961 A1 | 4/2006 | Chang et al. |
| 2007/0143655 A1 | 6/2007 | Niu et al. |
| 2008/0225818 A1 | 9/2008 | Niu et al. |
| 2008/0225819 A1* | 9/2008 | Niu et al. ..................... 370/342 |
| 2008/0225982 A1 | 9/2008 | Chrabieh et al. |
| 2010/0100795 A1* | 4/2010 | Yuan et al. ..................... 714/776 |
| 2011/0026623 A1* | 2/2011 | Srinivasa et al. ............... 375/260 |

FOREIGN PATENT DOCUMENTS

| | | |
|---|---|---|
| CN | 101627568 A | 1/2010 |
| JP | H11-313044 A | 11/1999 |
| JP | 2005-328463 A | 11/2005 |
| JP | 2005-341440 A | 12/2005 |
| JP | 2006-287931 A | 10/2006 |
| WO | 2005/109709 A1 | 11/2005 |
| WO | 2011/094184 A2 | 8/2011 |
| WO | 2011/094184 A3 | 11/2011 |

OTHER PUBLICATIONS

International Search Report and Written Opinion received for International Patent Application No. PCT/US2011/022341, mailed on Sep. 26, 2011, 9 pages.

International Preliminary Report on Patentability and Written Opinion received for PCT Patent Application No. PCT/US2011/022341, mailed on Aug. 16, 2012, 7 pages.

Office Action received for Japanese Patent Application No. 2011-013570, mailed on Dec. 25, 2012, 3 pages of English Translation and 2 pages of Japanese Office Action.

IEEE, "Wireless LAN Medium Access Control (MAC) and Physical Layer (PHY) specifications: High-speed Physical Layer in the 5 GHZ Band", IEEE Std 802.11a-1999, Sep. 16, 1999, 90 pages.

Office Action received for Chinese Patent Application No. 201110037811.5, mailed on Mar. 19, 2013, 27 pages of Office Action including 18 pages of English Translation.

Office Action received for Japnese Patent Application No. 2011-013570, mailed on May 21, 2013, 2 Pages of English Translation and 1 page of Office Action.

Office Action received for Chinese Patent Application No. 201110037811.5, mailed on Oct. 8, 2013, 19 pages of English Translation and 12 pages of Chinese Office Action.

* cited by examiner

*Primary Examiner* — Marcus R Smith
(74) *Attorney, Agent, or Firm* — Forefront IP Lawgroup, PLLC

(57) ABSTRACT

A method is described for adding coded bit padding for a orthogonal frequency division multiplexing (OFDM) data transmission device.

18 Claims, 4 Drawing Sheets

CODED BIT PADDING

BACKGROUND

Orthogonal frequency division multiplexing (OFDM) provides a useful way to modulate data for transmission. OFDM may be considered a form of digital multi-carrier modulation. A number of orthogonal sub-carriers are used to carry data. Data for transmission is then divided into several parallel data streams for transmission. Each of the sub-carriers may in turn be modulated using binary phase-shift keying (BPSK), quadrature phase-shift keying (QPSK), quadrature amplitude modulation (QAM), and so forth.

An OFDM system uses several carriers, or "tones," for functions including data, pilot, guard, and direct component. Data tones are used to transfer information between the transmitter and receiver via one of the channels. Pilot tones are used to maintain the channels, and may provide information about time/frequency and channel tracking. Guard tones may be inserted between symbols during transmission to avoid inter-symbol interference (ISI), such as might result from multi-path distortion. These guard tones also help the signal conform to a spectral mask. The nulling of the direct component or DC may be used to simplify direct conversion receiver designs.

In certain instances, an OFDM system, in order to send out OFDM symbols, implements padding bits. Bit padding allows a full OFDM symbol to be sent, although the padding bits per se are not needed. Bit padding typically may be implemented at the physical or PHY layer.

The Institute of Electrical and Electronics Engineers (IEEE) 802.11 standard defines protocols for wireless transmission. As the IEEE 802.11 standard evolves, support for new tone allocations, modulation and coding can create issues and problems. In particular, a condition can arise, where the PHY layer bit padding used in legacy IEEE 802.11 systems may not work.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

Overview

In order to implement legacy IEEE 802.11 coding and interleaving schemes and systems, coding schemes are implemented to move bit padding in the physical or PHY layer from before coding (encoder) to after coding (encoder). Exemplary implementations include an encoder module in devices to provide for such schemes and processes.

Illustrative System

Figure 1:
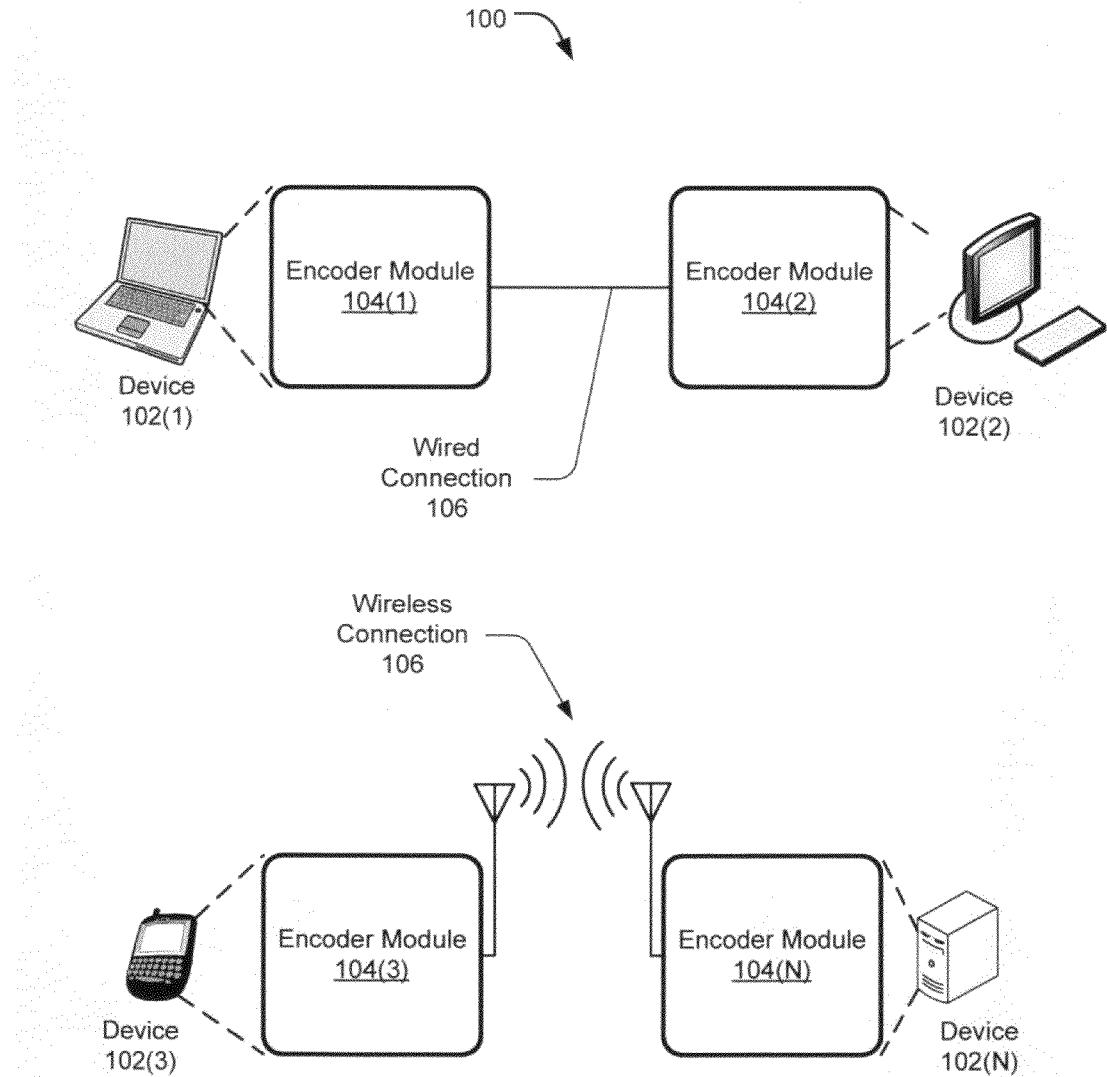
FIG. 1 is an illustrative system for implementing coded bit padding.

FIG. 1 is an illustrative system 100 that implements coded bit padding. The system 100 can include multiple devices 102 in communication with one another. In this example, the system includes a device 102(1) with an encoding module 104(1). Device 102(1) is coupled via a wired connection 106 to a device 102(2). Device 102(2) includes an encoding module 104(2). System 100 further includes a device 102(2) in wireless communication 108 with device 102(N). Device 102(3) includes an encoder module 104(3), and device 102(N) includes an encoder module 104(N).

Encoder modules 104 are implemented to provide coded bit padding for OFDM symbols transmitted by devices 102. In certain implementations, the devices 102 may include OFDM modules (not shown) to generate an OFDM signal.

Each device 102 can include a transmitter, receiver, or transceiver to convey output (i.e., OFDM symbols). These transmitters, receivers, or transceivers may be configured to convey the output via an electrical conductor, electromagnetic radiation, or both. Each device 102 includes one or more processors (described below) and a memory (described below) coupled to the processor(s).

Devices 102 can include wireless access points, radio frequency transceivers, software defined radios, modems, interface cards, cellular telephones, portable media players, desktop computers, laptops, tablet computers, net books, personal digital assistants, servers, standalone transceiver interfaces, and so forth.

In exemplary operations, communication in system 100 can implement an 80 MHz channel, or higher such as 120 MHz or 160 MHz and 256 QAM (quadrature amplitude modulation). In legacy IEEE 802.11, such features can be problematic for data tone selection. The encoding schemes and processes (i.e., encoding module 104) described herein, are directed to such issues.

The number of data tones implemented by system 100 may be even tone counts of 216, 220, 222, 224, 228, 230, 232 and 234 for a 80 MHz system. These numbers are based on the reuse of the IEEE 802.11n interleaver structure, and data bit flow. This is in addition to having a minimum tone count of at least two times the 40 MHz (i.e. 80 MHz) IEEE 802.11n system.

The described encoding schemes consider the addition of 256 QAM, with code rates such as 2/3 and 5/6, where the number of data tone count options drops by a half. This is due the numerology and flow used in the IEEE 802.11a/n standard. A code rate of 2/3 is attractive when coupled with 256 QAM. The 2/3 code rate is more effective from a transmitter power amplifier perspective, than rates such as 3/4 or 7/8, and can allow a decrease in power consumption or a less expensive device 102 to be utilized when implementing the same transmit range as legacy IEEE 802.11 systems. Furthermore, if legacy 20 MHz IEEE 802.11 systems use 256 QAM, coding rates of 2/3 or 5/6 may not be used. This can be the case, because providing new tone allocation (configurations) may not fit exactly in an integer number of OFDM symbols, unlike legacy IEEE 802.11 systems that have data tone counts and modulation and coding that create payloads that fit exactly in an integer number of OFDM symbols.

For legacy IEEE 802.11 encoding schemes, consideration can be made for two constraints, which depend on the OFDM symbol size and the encoder (encoding module 104). The first constraint is that the number of coded bits per OFDM symbol or Ncbps should be an integer. The second constraint is that the number of data bits per OFDM symbol or Ndbps should also be an integer. An integer for Ndbps can assure that all data lengths work with no additional padding using the current IEEE 801.11 a/n equations. If Ndbps is not an integer, then many payload sizes can result in a non-integer number of padding bits, or the number of encoded bits exceeding the number of OFDM symbols. In either case, this leads to a minimum of one additional OFDM symbol that is not needed, which includes only padding bits. Current IEEE 802.11a/n equations require that Ncbps and Ndbps be integers. In certain cases, the IEEE 802.11a/n equations the padding bits to be added can be a non integer, which results in the inability to fill out the packet.

The schemes processes described herein are not limited to by the having Ncbps and Ndbps to be integers. The schemes and processes that are described provide that for data tone counts to be used with various modulation or coding scenarios, to move the bit padding operation from the input of the encoder (coding), to the output of the encoder (coding), after the bits have been encoded. The following equation (1) can be used to compute the number of padding bits to fill out the least number of OFDM symbols to transmit the media access control or MAC payload.

$$N_{Pad}=N_{SYM}*N_{SD}-(N_{MACBYTES}*8+16+6) \quad (1)$$

Where $N_{Pad}$ is the number of padded symbols to be added; $N_{SYM}$ is the number of OFDM symbols based on the equation in IEEE 802.11a/n standard; $N_{SYM}$ is the number of data tones; $N_{MACBYTES}$ is the number of MAC layer bytes that are being passed to the PHY layer; 16 is the length of the service field; and 6 is the length of the tail bits.

This bit padding approach can remove an IEEE 802.11 requirement on the Ndbps and Ncbps for data tone allocation, with a number of modulation and coding combinations. The bit padding approach is also intended to be backwards compatibility with IEEE 802.11 systems/standards incorporated into current and legacy IEEE 802.11 processing chains. Furthermore, such a bit padding approach can allow for various combinations of data tones, modulation, and coding without restricting one of the aforementioned variables. In particular, restricting the number of data tones can lower system data rate, as would disallowing 256 QAM. Restricting the coding can, as discussed above, potentially increase cost or power consumption. In prior or legacy IEEE 802.11 systems, the numerology can only allow for integer data bits per OFDM symbol and integer number of coded bits per OFDM symbol. A new signal field can be required for next generation IEEE 802.11 systems, where knowledge of the padding method and number may have to be known. The bit padding approach can provide modulation and coding rates used in bandwidths of 60 to 160 MHz, and in particular 80 MHz.

Device Architecture

Figure 2:
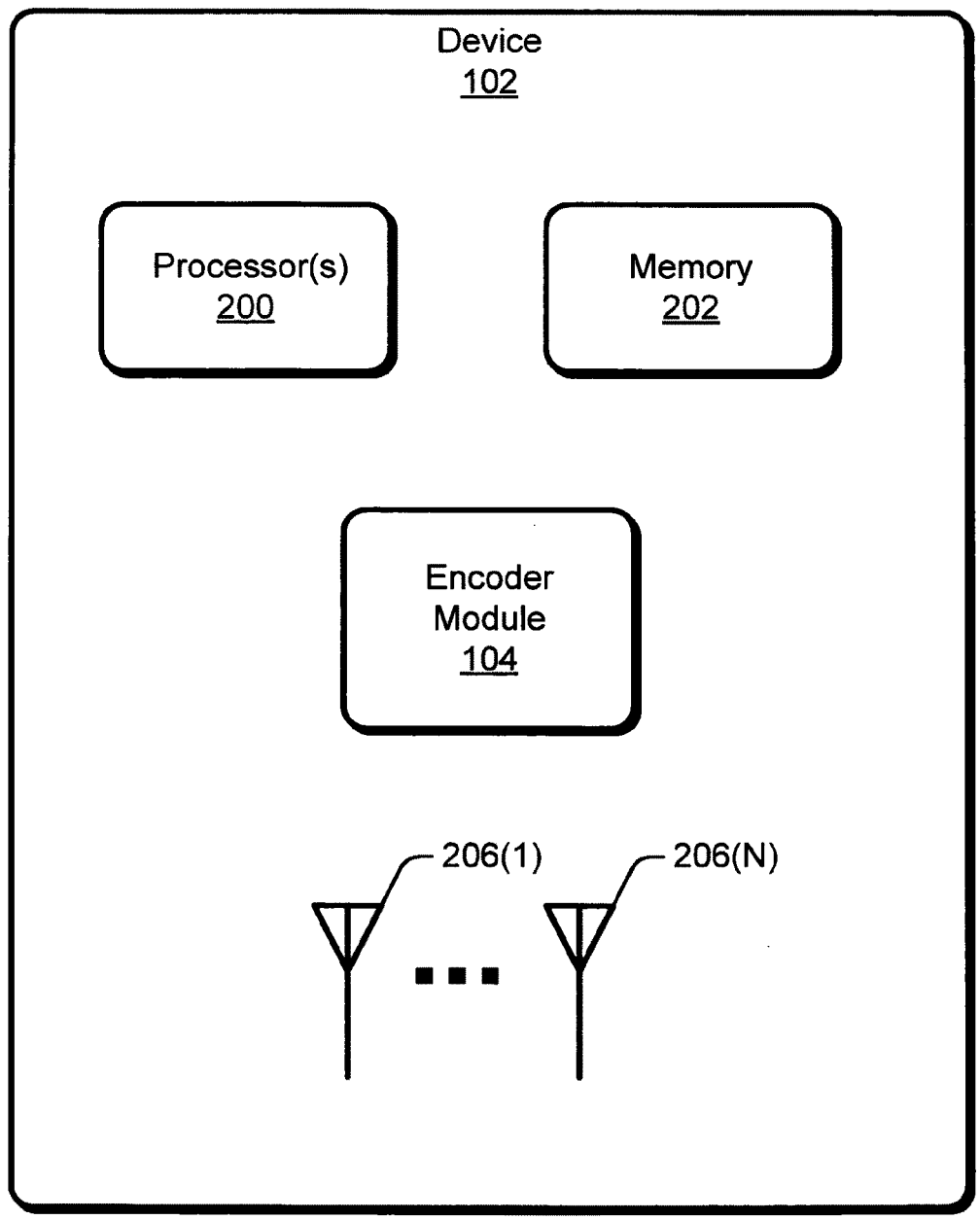
FIG. 2 is a block diagram of a exemplary device that implements coded bit padding.

FIG. 2 illustrates an exemplary device 104 that implements coded bit padding. The device 104 includes devices 104(1), 104(2), 104(3) and 104(N). Device 104 describes certain components and it is to be understood that described components can be replaced with other components, and combined with one another. Additional components and devices may also be included in device 104.

A host microprocessor or processor 200, which can include multiple processors, is provided. The processor 200 can be connected or coupled to a memory 202. Memory 202 can include multiple memory components and devices. The memory component 202 can be coupled to the processor 200 to support and/or implement the execution of programs, such as key generation and delivery protocol. The memory component 202 includes removable/non-removable and volatile/non-volatile device storage media with computer-readable instructions, which are not limited to magnetic tape cassettes, flash memory cards, digital versatile disks, and the like. The memory 202 can store processes that perform the methods that are described herein.

In an implementation, the IEEE 802.11 standard is extended and implemented by device 104. Therefore, in such an implementation, device 104 includes particular hardware/firmware/software configurations to support the IEEE 802.11 standard. Device 104 implements a common medium access control or MAC layer, which provides a variety of functions that support the operation of IEEE 802.11 based wireless communications. As known by those skilled in the art, the MAC Layer manages and maintains communications between IEEE 802.11 wireless communication devices by coordinating access to a shared radio channel and utilizing protocols that enhance communications over a wireless medium. The MAC layer uses an 802.11 physical or PHY layer, to perform the tasks of carrier sensing, transmission, and receiving of OFDM symbols.

The device 104 further includes encoder module 104. The encoder module 104, which is further described below, is used to perform receiving data bits, encoding (coding), modulating, and outputting OFDM symbols. Furthermore, one or more antennae 206(1) to 206(N) can be included with or connected to the device 104. Antennae 206 can include multiple antennae for multiple input, multiple output (MIMO) operation. Antenna 210 can be configured to receive and send transmission.

Encoder Module Architecture

Figure 3:
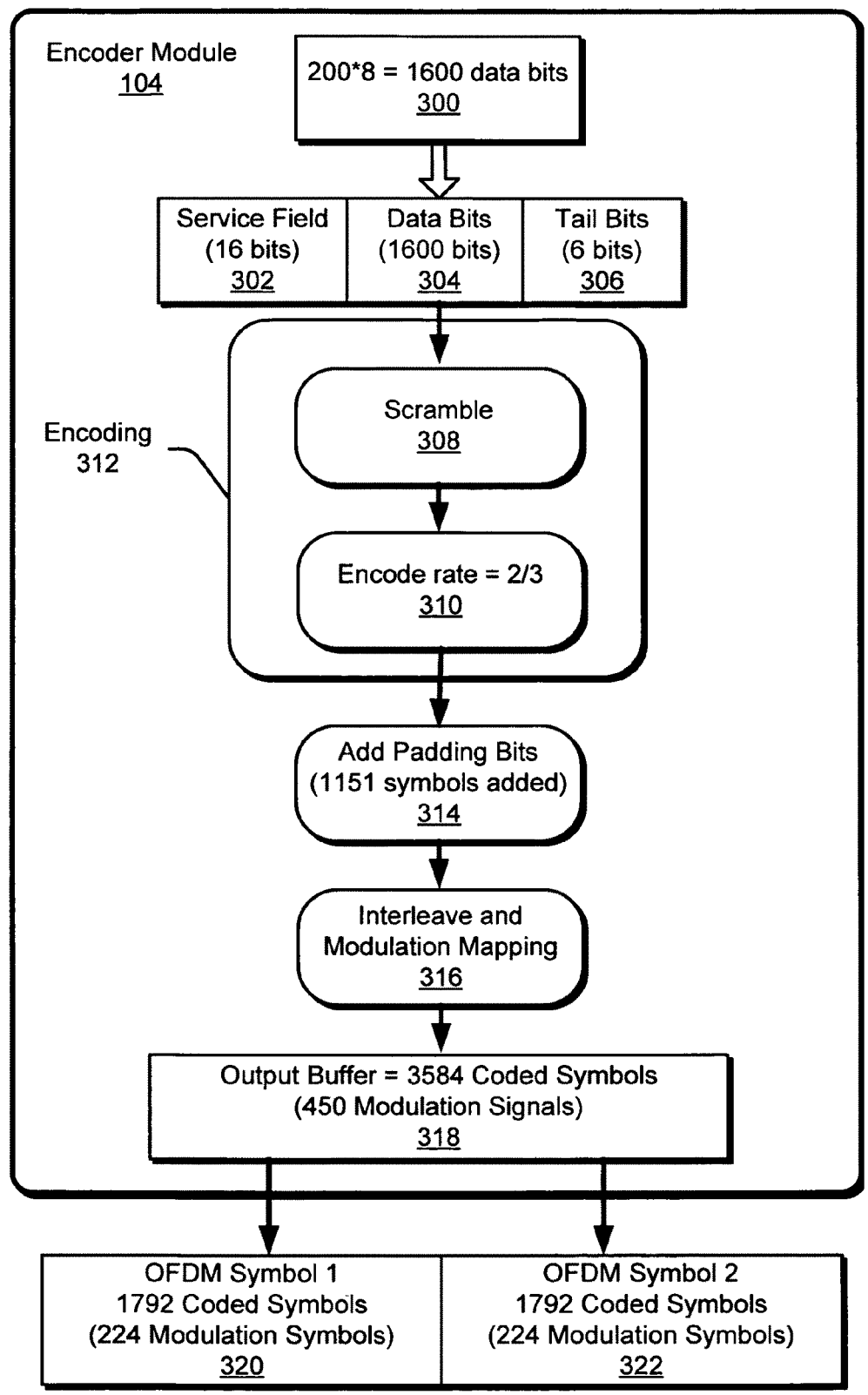
FIG. 3 is a block diagram of an exemplary encoder module for bit padding.

FIG. 3 illustrates an exemplary encoder module 104 for bit padding. The particular operating parameters described are illustrative and are not intended to be limiting. It is to be understood that other operating parameters may be implemented.

In this example, encoder module 104 can operate using an 80 MHz transmission bandwidth with 224 data tones, implementing 256 QAM with a code rate of 2/3. The data bits 300, include 200 bytes (200*8) or 1600 data bits, which are passed from the MAC layer. The data bits 300 are passed onto a payload represented by a service field 302 having 16 bits, the data bits 304 (1600 data bits), and tail bits 306. The tail bits 306 are used to flush the encoder module 104. The payload is sent to a scrambling process 308 and encoded 310 at a 2/3 rate. The scramble 308 and encode 310 can be presented as a coding or encoding module 312. Addition of padding bits represented by module 314, is performed. In this example, 1151 symbols or bits are added. Interleaving and modulation mapping can be performed as shown in module 316. An output buffer 318 receives the interleaved and modulated symbols which included 3584 coded symbols or 450 modulation signals.

A minimal number of OFDM symbols represented by OFDM Symbol 1 320 and OFDM Symbol 2 322 is shown. The OFDM Symbol 1 320 and OFDM Symbol 2 are output of the output buffer 318. In contrast to schemes that implement the use of padding bits prior to coding or encoding (i.e., encoding 312), no extra padding bits are needed, and no extra OFDM symbol is generated.

Exemplary Process for Coded Bit Padding

Figure 4:
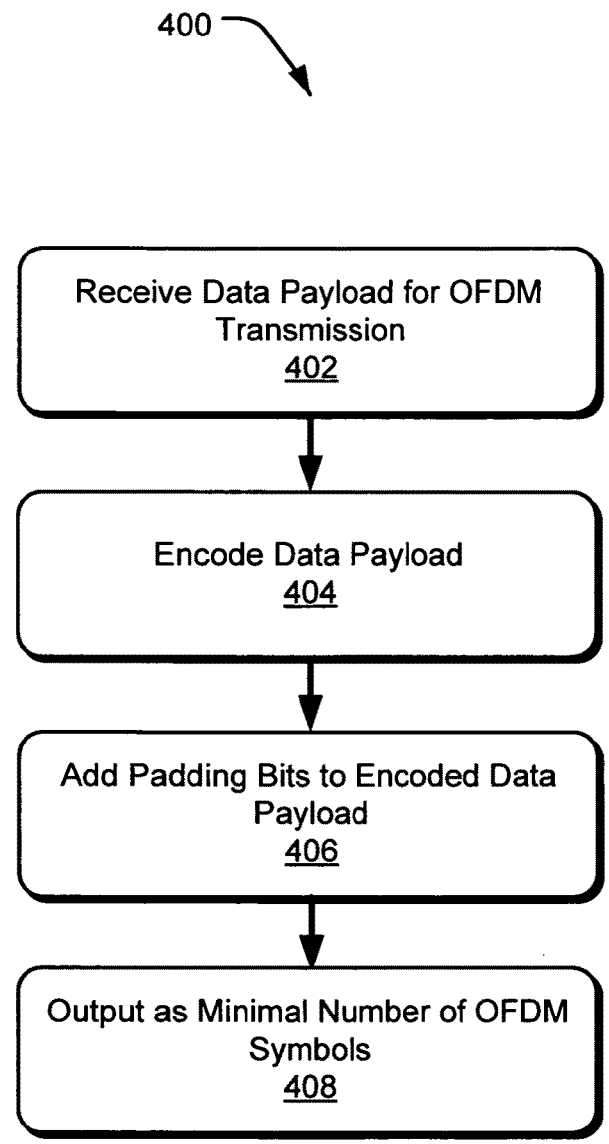
FIG. 4 is a flow chart for a process of coded bit padding.

FIG. 4 is a flow chart for an example process 400 for coded bit padding. As an example, the code bit padding may be performed using the encoder module 104 of the device 102. The order in which the method is described is not intended to be construed as a limitation, and any number of the described method blocks can be combined to implement the method, or alternate method. Additionally, individual blocks can be deleted from the method without departing from the spirit and scope of the subject matter described herein. Furthermore, the method can be implemented in any suitable hardware, software, firmware, or a combination thereof, without departing from the scope of the invention.

At block 402, receiving a data payload for OFDM transmission is performed. As discussed above, the data payload can be passed from the MAC layer to the PHY layer. The received payload can include data bits along with service data bits and tail bits. The data payload may be determined by a number of data tones, which as discussed above, can be an even number tone count.

At block 404, coding or encoding is performed on the data payload. As discussed above, 256 QAM may be implemented, and code rates such 2/3 or 5/6. Furthermore, bandwidth operation can include 60 to 160 MHz, and particularly 80 MHz.

At block 406, adding padding bits is performed. The number of padding bits may be derived by the following equation as discussed above, to fill out the least number of OFDM symbols to transmit the media access control or MAC payload.

$$N_{Pad}=N_{SYM}*N_{SD}-(N_{MACBYTES}*8+16+6) \quad (1)$$

Where $N_{Pad}$ is the number of padded symbols to be added; $N_{SYM}$ is the number of OFDM symbols based on the equation in IEEE 802.11a/n standard; $N_{SYM}$ is the number of data tones; $N_{MACBYTES}$ is the number of MAC layer bytes that are being passed to the PHY layer; 16 is the length of the service field; and 6 is the length of the tail bits. In addition, interleaving and modulation may occur after padding bits are added.

At block 408, outputting a minimal number of OFDM symbols is performed. The number of coded bits per OFDM signal or Ncbps can be an integer. Also, the number of data bits per OFDM signal or Ndbps can also be an integer.

CONCLUSION

Although specific details of illustrative methods are described with regard to the figures and other flow diagrams presented herein, it should be understood that certain acts shown in the figures need not be performed in the order described, and may be modified, and/or may be omitted entirely, depending on the circumstances. As described in this application, modules and engines may be implemented using software, hardware, firmware, or a combination of these. Moreover, the acts and methods described may be implemented by a computer, processor or other computing device based on instructions stored on memory, the memory comprising one or more computer-readable storage media (CRSM).

The CRSM may be any available physical media accessible by a computing device to implement the instructions stored thereon. CRSM may include, but is not limited to, random access memory (RAM), read-only memory (ROM), electrically erasable programmable read-only memory (EEPROM), flash memory or other solid-state memory technology, compact disk read-only memory (CD-ROM), digital versatile disks (DVD) or other optical disk storage, magnetic disk storage or other magnetic storage devices, or any other medium which can be used to store the desired information and which can be accessed by a computing device.

What is claimed is:

1. A method implemented by a device for bit padding, for orthogonal frequency division multiplexing (OFDM) transmission, comprising:
    receiving an unpadded data payload for the OFDM transmission, the unpadded data payload includes service field and tail bits;
    encoding the unpadded data payload;
    adding the bit padding to include padded symbols to the encoded data payload, wherein number of padded symbols is computed and based at least upon number of OFDM symbols, even-number tone counts of data tones, and number of media access control (MAC) layer bytes, wherein a number of bits added to the encoded data payload is defined by the equation $$N_{pad}=N_{SYM}*N_{SD}-(N_{MACBYTES}*8+16+6),$$

wherein $N_{pad}$ comprises the number of bits to be added, $N_{SYM}$ comprises the number of OFDM symbols, $N_{SD}$ comprises the even-number tone counts of data tones, and $N_{MACBYTES}$ comprises the number of bytes in the unpadded data payload; and
    outputting a minimal number of OFDM symbols.

2. The method of claim 1, wherein the receiving provides for the unpadded data payload to be passed from the media access control (MAC) layer to a physical (PHY) layer of the device.

3. The method of claim 1, wherein the encoding is based on a 2/3 rate.

4. The method of claim 1, wherein the encoding implements 256 quadrature amplitude modulation.

5. The method of claim 1, wherein the outputting the minimal number of OFDM symbols is or is not dependent on a number of coded bits per OFDM signal (Ncpbs) and a number of data bits per OFDM signal (Ndps) to be an integer.

6. The method of claim 1 further comprising interleaving and modulating after the adding of the bit padding to the encoded data payload.

7. One or more non-transitory computer-readable storage media storing instructions that, when executed by one or more processors, cause the one or more processors to perform acts comprising:
    processing data payload that includes unpadded data bits for OFDM transmission;
    encoding the data payload based on particular data tones;
    adding bit padding to include padded symbols to the encoded data payload, wherein number of padded symbols is computed and based at least upon number of OFDM symbols, even-number tone counts of data tones, and number of media access control (MAC) layer bytes in the unpadded data bits, wherein the adding bit padding is defined by the equation $$N_{pad}=N_{SYM}*N_{SD}-(N_{MACBYTES}*8+16+6),$$

wherein $N_{pad}$ comprises the number of bits to be added, $N_{SYM}$ comprises the number of OFDM symbols, $N_{SD}$ comprises the even-number tone counts of data tones, and $N_{MACBYTES}$ comprises the number of bytes in the unpadded data payload; and
    transmitting OFDM symbols representing a bit padded encoded data payload.

8. The one or more readable media of claim 7, wherein the processing of the data payload includes processing service field bits and tail bits.

9. The one or more readable media of claim 7, wherein the processing data payload is performed at a device's physical (PHY) layer.

10. The one or more readable media of claim 7, wherein the encoding is implemented for 80 MHz bandwidth transmission.

11. The one or more readable media of claim 7, wherein the transmitting is of a minimal number of OFDM symbols.

12. The one or more readable media of claim 7 further comprising interleaving and modulating after the adding bit padding to the encoded data payload.

13. A device for adding data bits for orthogonal frequency division multiplexing (OFDM) transmission, comprising:
   one or more processors;
   a memory coupled to the one or more processors; and
   an encoder module configure to:
   receive an unpadded data payload;
   encode the unpadded data payload to generate an encoded data payload;
   add padding bits to the encoded data pay load, wherein number of padded bits is computed and based at least upon number of OFDM symbols, even-number tone counts of data tones, and number of media access control (MAC) bytes in the unpadded data payload, wherein number of coded bits per OFDM symbol and number of data bits per OFDM symbol is or is not an integer, wherein a number of bits added to the encoded data payload is defined by the equation $N_{Pad} = N_{SYM} * N_{SD} - (N_{MACBYTES} * 8 + 16 + 6)$, wherein $N_{pad}$ comprises the number of bits to be added, $N_{SYM}$ comprises the number of OFDM symbols $N_{SD}$ comprises the even-number tone counts of data tones, and $N_{MACBYTES}$ comprises the number of bytes in the unpadded data payload;
   output a minimal number of the OFDM symbols.

14. The device of claim 13, wherein the encoder module encodes at a 2/3 rate.

15. The device of claim 13, wherein the encoder module implements 256 QAM.

16. The device of claim 13, wherein the encoder module operates with 224 data tones.

17. The device of claim 13, wherein the encoder module includes a coding module to encode the unpadded data payload and generate the encoded data payload based on a particular data rate.

18. The device of claim 13, wherein the encoder modules includes an interleaver that interleaves the encoded data payload after the padding bits are added.

* * * * *

UNITED STATES PATENT AND TRADEMARK OFFICE
CERTIFICATE OF CORRECTION

| | | |
|---|---|---|
| PATENT NO. | : 8,855,142 B2 | Page 1 of 1 |
| APPLICATION NO. | : 12/658014 | |
| DATED | : October 7, 2014 | |
| INVENTOR(S) | : Thomas J. Kenney et al. | |

It is certified that error appears in the above-identified patent and that said Letters Patent is hereby corrected as shown below:

On The Title Page, item (56), under "OTHER PUBLICATIONS", in column 2, line 16, delete "Japnese" and insert -- Japanese --, therefor.

Signed and Sealed this
Tenth Day of February, 2015

Michelle K. Lee
*Deputy Director of the United States Patent and Trademark Office*